(12) United States Patent
Ko et al.

(10) Patent No.: US 11,491,989 B2
(45) Date of Patent: Nov. 8, 2022

(54) VEHICLE USING ECCENTRIC WHEEL

(71) Applicants: Hyundai Motor Company, Seoul (KR); Kia Motors Corporation, Seoul (KR)

(72) Inventors: Hun Keon Ko, Gyeonggi-do (KR); Eun Ho Seo, Gyeonggi-do (KR); Joo Young Chun, Seoul (KR); Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 318 days.

(21) Appl. No.: 16/849,711

(22) Filed: Apr. 15, 2020

(65) Prior Publication Data
US 2021/0061284 A1 Mar. 4, 2021

(30) Foreign Application Priority Data

Aug. 29, 2019 (KR) .................. 10-2019-0106760

(51) Int. Cl.
| | | |
|---|---|---|
| *B60G 17/015* | (2006.01) | |
| *B60W 30/19* | (2012.01) | |
| *B60G 21/08* | (2006.01) | |
| *B60G 21/00* | (2006.01) | |
| *B60B 19/00* | (2006.01) | |

(52) U.S. Cl.
CPC ............ *B60W 30/19* (2013.01); *B60B 19/00* (2013.01); *B60G 17/0157* (2013.01); *B60G 21/007* (2013.01); *B60G 21/08* (2013.01)

(58) Field of Classification Search
CPC .......................... B60K 7/0007; B60G 17/0157; B60G 21/007; B60B 2900/911; B60B 19/00
See application file for complete search history.

(56) References Cited

U.S. PATENT DOCUMENTS

| | | | | |
|---|---|---|---|---|
| 3,806,141 A | * | 4/1974 | Janer | B62D 49/08 |
| | | | | 280/6.154 |
| 5,248,019 A | * | 9/1993 | Sbarro | B60B 3/048 |
| | | | | 301/1 |
| 8,267,189 B2 | | 9/2012 | Manschitz et al. | |
| 2005/0206101 A1 | * | 9/2005 | Bouton | B60G 21/007 |
| | | | | 280/6.154 |

(Continued)

FOREIGN PATENT DOCUMENTS

| | | | | |
|---|---|---|---|---|
| CN | 106004285 A | * | 10/2016 | ................ B60F 5/02 |
| CN | 106142982 A | * | 11/2016 | |

(Continued)

*Primary Examiner* — Paul N Dickson
*Assistant Examiner* — Maxwell L Meshaka
(74) *Attorney, Agent, or Firm* — Fox Rothschild LLP

(57) ABSTRACT

A vehicle includes a vehicle body, at least one wheel includes an annular tire that rotates to drive the vehicle body along a main driving direction, a wheel gear disposed on an inner surface of the tire, and an in-wheel actuator that is connected to the wheel gear and that rotates to rotate the tire, and positioning devices that are fixed to the vehicle body and that rotate the at least one wheel relative to the vehicle body to change positions of the at least one wheel relative to the vehicle body, the at least one wheel being coupled to at least one positioning device so as to be rotatable.

18 Claims, 12 Drawing Sheets

(56) References Cited

U.S. PATENT DOCUMENTS

| | | | |
|---|---|---|---|
| 2006/0012144 A1* | 1/2006 | Kunzler | B60G 3/01 |
| | | | 280/124.125 |
| 2009/0020299 A1 | 1/2009 | Manschitz et al. | |
| 2010/0155168 A1* | 6/2010 | Mies | B60K 7/0007 |
| | | | 180/300 |
| 2010/0252338 A1* | 10/2010 | Xie | B60K 7/0007 |
| | | | 180/6.5 |
| 2018/0009311 A1* | 1/2018 | Hays | B60K 7/0007 |
| 2018/0117960 A1* | 5/2018 | Hays | F16D 65/12 |
| 2018/0354298 A1* | 12/2018 | Hays | B60K 7/0007 |
| 2022/0024268 A1* | 1/2022 | Wuebbolt-Gorbatenko | |
| | | | B60G 3/14 |

FOREIGN PATENT DOCUMENTS

| | | | | |
|---|---|---|---|---|
| CN | 107776331 A * | 3/2018 | | |
| JP | 2816671 B2 | 10/1998 | | |
| JP | 2009-023084 A | 2/2009 | | |
| WO | WO-2008067822 A2 * | 6/2008 | | B60K 17/043 |

\* cited by examiner

US 11,491,989 B2

VEHICLE USING ECCENTRIC WHEEL

CROSS-REFERENCE TO RELATED APPLICATION

This application claims under 35 U.S.C. § 119(a) the benefit of Korean Patent Application No. 10-2019-0106760, filed in the Korean Intellectual Property Office on Aug. 29, 2019, the entire contents of which are incorporated herein by reference.

BACKGROUND

(a) Technical Field

The present disclosure relates to a vehicle using eccentric wheels.

(b) Description of the Related Art

In general, a vehicle having a power source on a vehicle body transmits torque of the power source to wheels through shaft members and is driven using propulsive force generated by friction between the rotating wheels and the ground.

Auxiliary apparatuses such as suspension components are additionally provided to allow the wheels fixed to the vehicle body through the shaft members to respond to various external environmental changes, such as the occurrence of tilt, the appearance of an obstacle, and the like, thereby ensuring stability of driving.

However, for efficient driving, various auxiliary apparatuses employed for large vehicles may not be used for small vehicles. In some cases, the auxiliary apparatuses need to be lightweight so as to be carried easily, and it is necessary to maintain simplicity of production.

SUMMARY

An aspect of the present disclosure provides a vehicle using eccentric wheels, where positions of the wheels are adjustable relative to a vehicle body.

According to an aspect of the present disclosure, a vehicle includes a vehicle body and at least one wheel includes an annular tire that rotates to drive the vehicle body along a main driving direction, a wheel gear disposed on an inner surface of the annular tire, an in-wheel actuator that is connected to the wheel gear and that rotates to rotate the tire, and at least one positioning device that is fixed to the vehicle body and that rotates the at least one wheel relative to the vehicle body to change positions of the at least one wheel relative to the vehicle body, the at least one wheel being coupled to the at least one positioning device so as to be rotatable.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
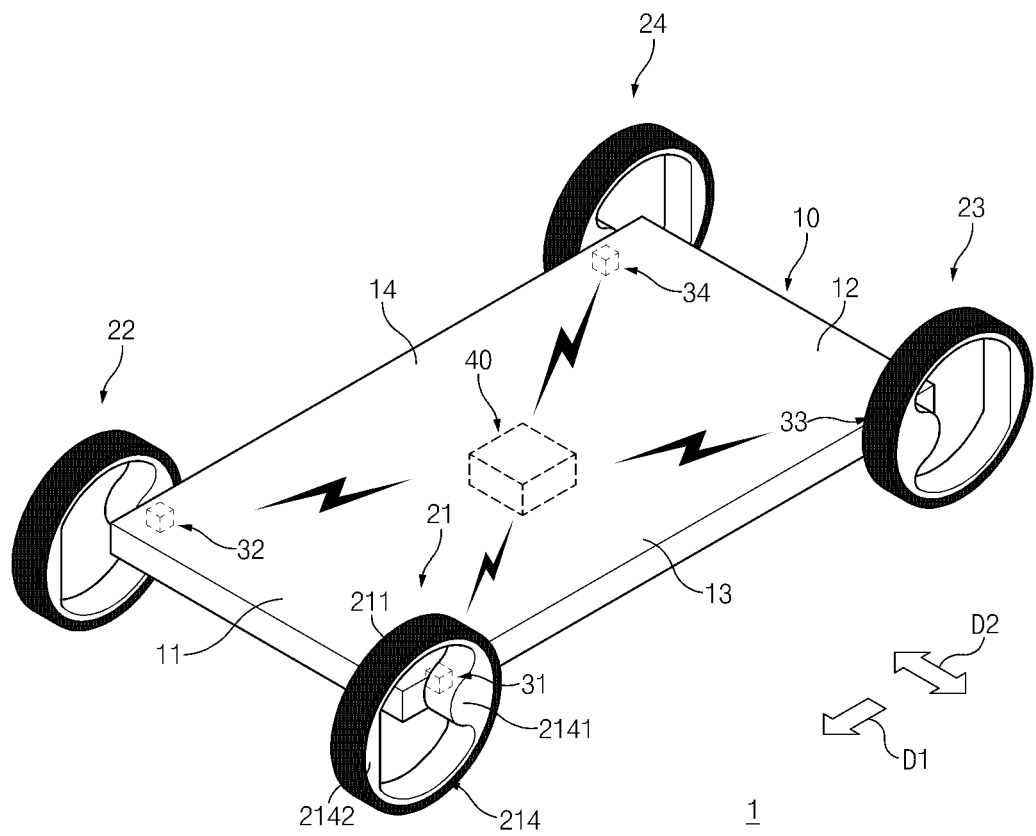
FIG. 1 is a schematic perspective view of a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, they may mean the components are not only directly "connected", "coupled", or "linked" but also are indirectly "connected", "coupled", or "linked" via a third component.

FIG. 1 is a schematic perspective view of a vehicle 1 according to an embodiment of the present disclosure.

Referring to FIG. 1, the vehicle 1 according to the embodiment of the present disclosure includes a vehicle body 10, a plurality of wheels 21, 22, 23, and 24, and positioning devices 31, 32, 33, and 34 corresponding to the wheels, respectively. In this specification, the term "driving direction D1" means one of the directions in which the vehicle body 10 is movable by rotation of the wheels 21, 22, 23, and 24, and the term "left/right direction D2" means a direction perpendicular to the driving direction D1 and the vertical direction.

The vehicle body 10 is a component for carrying occupants of the vehicle 1. In FIG. 1, the vehicle body 10 is illustrated in the shape of a plate on which people or things may be seated. However, the vehicle body 10 may further include a component for preventing departure of people or things, or may be formed in a structure on which people or things are able to be easily seated. The vehicle body 10 may have a front side 11 located at the front of the vehicle body 10 with respect to the driving direction D1, a rear side 12 located at the back of the vehicle body 10 with respect to the driving direction D1, a left side 13 located on the left hand side of the vehicle body 10 with respect to the left/right direction D2, and a right side 14 located on the right hand side of the vehicle body 10 with respect to the left/right direction D2.

The vehicle body 10 may be equipped with the positioning devices 31, 32, 33, and 34. The positioning devices 31, 32, 33, and 34 may be disposed inside the vehicle body 10 as illustrated in FIG. 1. However, the positioning devices 31, 32, 33, and 34 may be disposed to be exposed to the outside.

In addition, the vehicle body 10 may further include a steering apparatus connected thereto (not illustrated). The steering apparatus may be physically or electrically connected to the wheels 21, 22, 23, and 24 and the positioning devices 31, 32, 33, and 34 such that operations of the wheels 21, 22, 23, and 24 are changed by operating the steering apparatus. Further, the steering apparatus may be electrically connected to a processor 40 and may indirectly control the positioning devices 31, 32, 33, and 34 and the wheels 21, 22, 23, and 24 to perform steering. The steering apparatus may be implemented with, but is not limited to, a steering wheel that a user can grip and rotate appropriately.

Figure 2:
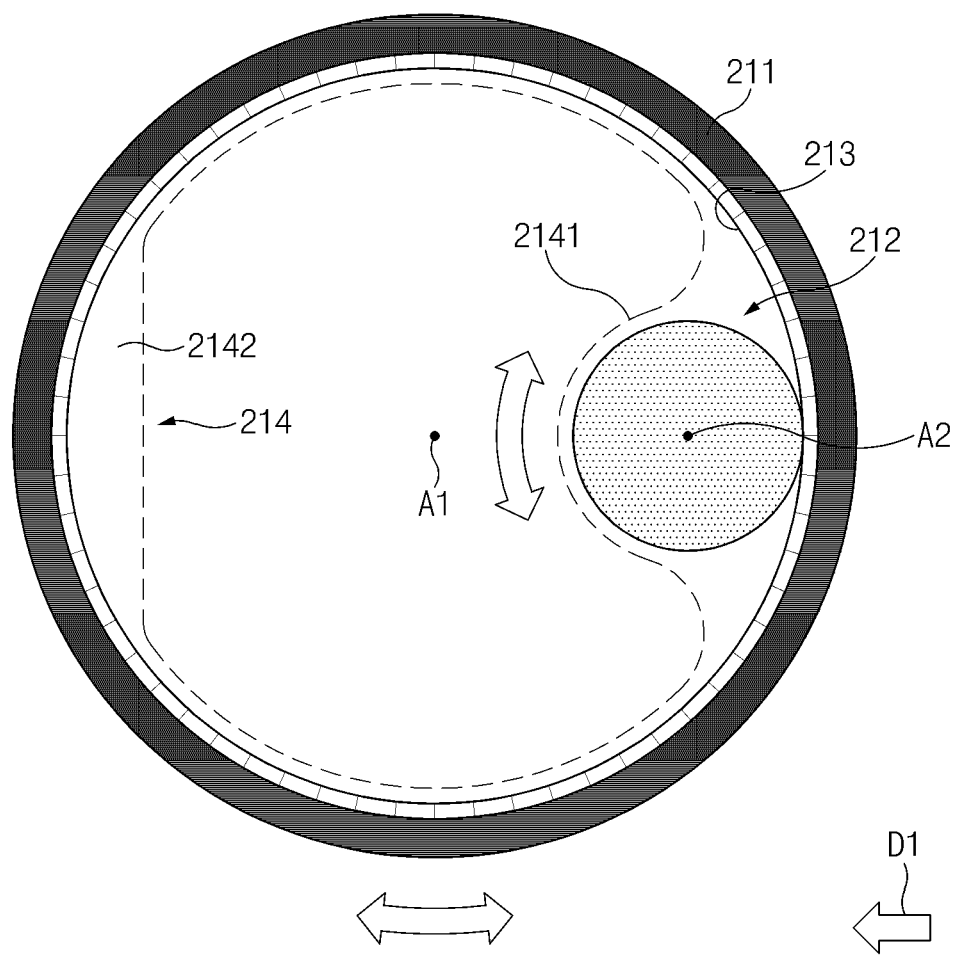
FIG. 2 is a schematic side view of a wheel according to an embodiment of the present disclosure, where a wheel frame is transparently illustrated.
Figure 3:
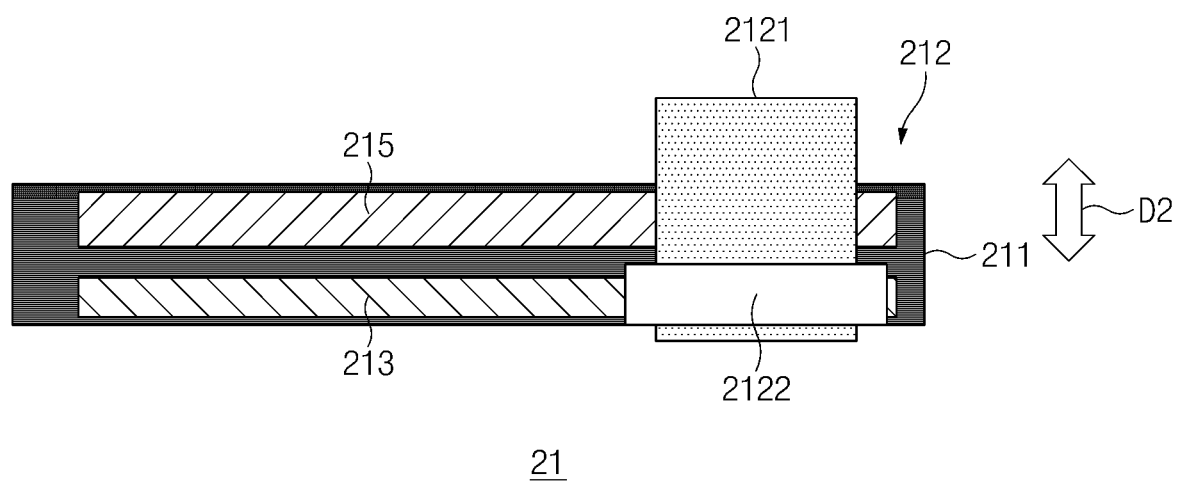
FIG. 3 is a schematic sectional view of the wheel according to the embodiment of the present disclosure as viewed from above.

FIG. 2 is a schematic side view of the wheel 21, 22, 23, or 24 according to an embodiment of the present disclosure, where a wheel frame 214 is transparently illustrated. FIG. 3 is a schematic sectional view of the wheel 21, 22, 23, or 24 according to the embodiment of the present disclosure as viewed from above.

The vehicle 1 according to the embodiment of the present disclosure includes the wheels 21, 22, 23, and 24 that rotate to drive the vehicle body 10. At least one wheel can be used. Each of the wheels 21, 22, 23, and 24 includes a tire 211, a wheel gear 213, and an in-wheel actuator 212. The four wheels 21, 22, 23, and 24 may be arranged as illustrated. However, the number of wheels is not limited thereto.

With respect to the driving direction D1 and the left/right direction D2, the wheel located on the front left side 13 of the vehicle body 10, the wheel located on the front right side 14, the wheel located on the rear left side 13, and the wheel located on the rear right side 14 may be referred to as the first wheel 21, the second wheel 22, the third wheel 23, and the fourth wheel 24, respectively. Among the wheels 21, 22, 23, and 24, the first wheel 21 and the second wheel 22 located at the front of the vehicle body 10 may be referred to as the front wheels 21 and 22, and the third wheel 23 and the fourth wheel 24 located at the back of the vehicle body 10 may be referred to as the rear wheels 23 and 24.

In describing components of the wheels 21, 22, 23, and 24, the first wheel 21 will be described as representative of each of the wheels.

The tire 211 is a component that rotates to drive the vehicle body 10 along the driving direction D1. The tire 211 may be formed in an annular shape. The tire 211 is configured to make contact with the ground and may rotate about the left-right direction D2 to move along the driving direction D1. The tire 211 may be formed of a material with elasticity, but the material of the tire 211 is not limited thereto. In the vehicle 1 according to the embodiment of the present disclosure, axes of rotation about which respective components rotate may be parallel to the left/right direction D2.

The wheel gear 213 is a component disposed on the inner surface of the tire 211. The word "inner surface of the tire 211" is used to generally call surfaces disposed at an inner part of the tire 211 so that those surrounds a circular inner area of the tire 211. Therefore, the inner surface of the tire 211 can also be an inner surface of an extra frame which is disposed inside the tire 211. The wheel gear 213 is connected with the in-wheel actuator 212 and is rotated by rotation of the in-wheel actuator 212. The wheel gear 213 may be formed in an annular shape. The inner circumferential surface of the wheel gear 213 may be connected with the in-wheel actuator 212, and the outer circumferential surface of the wheel gear 213 may be brought into contact with and coupled with the inner surface of the tire 211. Accordingly, when the in-wheel actuator 212 rotates, the rotation may be transmitted to the inner circumferential surface of the wheel gear 213, and the wheel gear 213 may rotate correspondingly. To enable the rotation, the wheel gear 213 may have gear teeth formed on the inner circumferential surface thereof, and the in-wheel actuator 212 may be engaged with the gear teeth formed on the inner circumferential surface of the wheel gear 213.

The in-wheel actuator 212 is a component that rotates the wheel gear 213 to rotate the tire 211. The in-wheel actuator 212 may include an in-wheel drive member 2121 that is implemented with a motor capable of generating a driving force and an in-wheel gear 2122 that is connected to a shaft of the in-wheel drive member 2121 and the wheel gear 213 and that transmits the driving force of the in-wheel drive member 2121 to the wheel gear 213. The in-wheel gear 2122 may have, on the outer circumferential surface thereof, gear teeth that are engaged with the gear teeth formed on the inner circumferential surface of the wheel gear 213.

The axis A1 of rotation of the tire 211 may not be in agreement with (i.e., may not correspond to) the axis A2 of rotation of the in-wheel actuator 212. As illustrated, the axes of rotation of the tire 211 and the wheel gear 213 may be in agreement with (i.e., correspond to) each other. However, the in-wheel gear 2122 of the in-wheel actuator 212 may be engaged with one location of the inner circumferential surface of the wheel gear 213, and therefore the axis A2 of rotation of the in-wheel actuator 212 may not correspond to the axis A1 of rotation of the tire 211. That is, the in-wheel actuator 212 may rotate the tire 211 in the state of being eccentrically located relative to the tire 211. As illustrated in FIG. 2, the axis A2 of rotation of the in-wheel actuator 212 may be disposed closer to the inner circumferential surface of the tire 211 than the axis A1 or rotation of the tire 211 that is located at a center of the tire 211.

The wheels 21, 22, 23, and 24 may further include the wheel frame 214. The wheel frame 214 may cover the inner surface of the tire 211 to form a space in which the wheel gear 213 is embedded. To cover the inner surface of the tire 211, the wheel frame 214 may be formed in an annular shape that is open in a center thereof. The wheel frame 214 may cover the inner surface of the tire 211 from the inside of the tire 211 to cause the wheel gear 213 and the in-wheel actuator 212 to be embedded in the space formed between the wheel frame 214 and the tire 211.

To form the space in which the in-wheel actuator 212 is embedded, the wheel frame 214 may have an actuator area 2141 that protrudes inward further than the portion covering only the wheel gear 213. The actuator area 2141 may protrude inward in a shape corresponding to the shape of the exterior of the in-wheel actuator 212.

The wheel frame 214 may cover the inner surface of the tire 211, and the center of the wheel frame 214 may correspond to the center of the tire 211. Accordingly, the axis A1 of rotation of the tire 211 may pass through the center of the wheel frame 214. However, the wheel frame 214 does not rotate together with the tire 211 and the wheel gear 213. The tire 211 may rotate relative to the wheel frame 214 that is in a fixed state. The position of the wheel frame 214, which forms the space in which the in-wheel actuator 212 is embedded, and the position of the in-wheel actuator 212, which is embedded in the space of the wheel frame 214, may be fixed relative to the vehicle body 10. In this state, only the tire 211 may rotate. However, the wheel frame 214 may rotate by rotation of the positioning device 31, 32, 33, or 34 that will be described below. A specific description thereabout will be given in the description of the positioning device 31, 32, 33, or 34.

To enable this operation, the tire 211 may be connected to the outer surface of the wheel frame 214 so as to be rotatable. Although the tire 211 is connected to the wheel frame 214 so as to be rotatable, the wheel frame 214 may be formed to prevent the tire 211 from being separated from the wheel frame 214 in the left/right direction D2.

The wheel frame 214 may include an additional area 2142 on the opposite side to the actuator area 2141 with respect to the axis A1 of rotation of the tire 211. The additional area 2142 may protrude inward further than the portion covering only the wheel gear 213. A surface of the additional area 2142 that faces toward the center of the wheel frame 214 may have a profile extending along a direction perpendicular to the axis A1 of rotation of the tire 211, when viewed from a side as illustrated in FIG. 2. A component necessary for control or driving of the wheel 21, 22, 23, or 24 other than the in-wheel actuator 212 may be additionally embedded in the space formed between the additional area 2141 and the tire 211.

The wheel frame 214 may be coupled to the positioning device 31, 32, 33, or 34 so as to be rotatable. The area of the wheel frame 214 that is connected with the positioning device 31, 32, 33, or 34 may be the actuator area 2141. At least one positioning device can be used.

An annular in-wheel bearing 215 that makes contact with the inner circumferential surface of the tire 211 may be additionally disposed on the inner surface of the tire 211. The inner circumferential surface of the in-wheel bearing 215 may make contact with the in-wheel actuator 212 to support rotation of the tire 211 relative to the in-wheel actuator 212.

Figure 4:
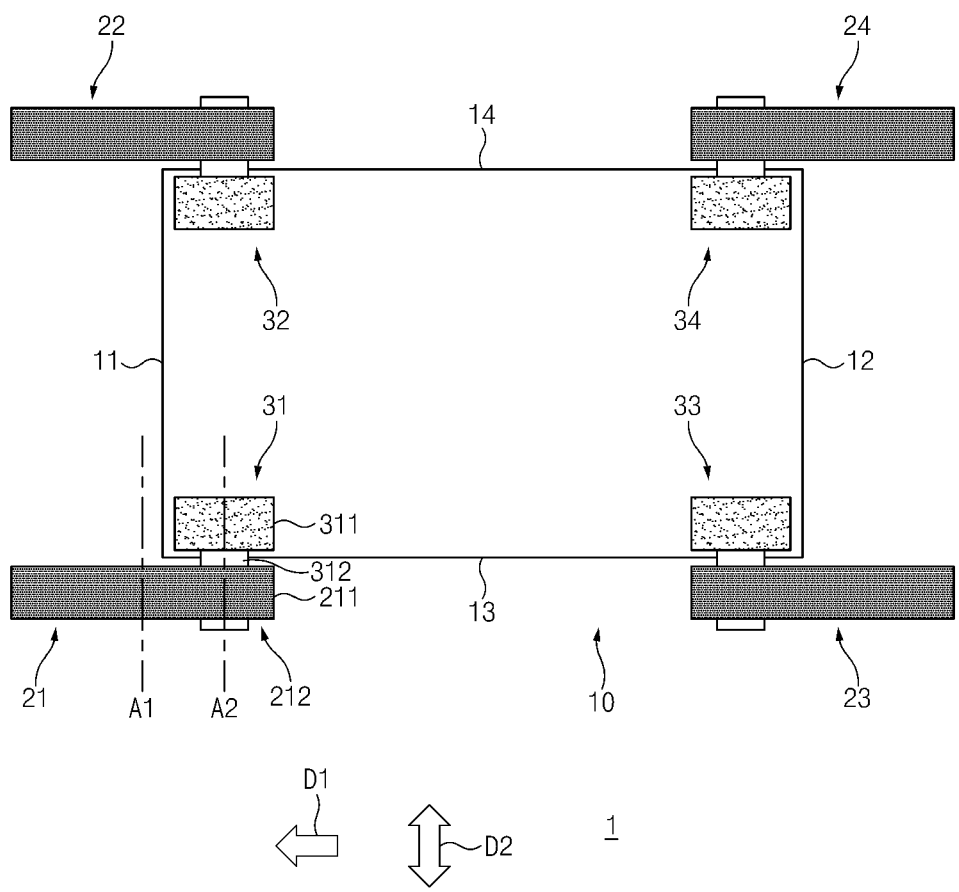
FIG. 4 is a schematic plan view illustrating positioning devices of the vehicle according to an embodiment of the present disclosure.
Figure 5:
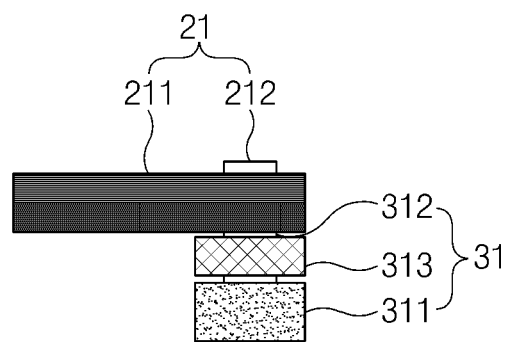
FIG. 5 is a schematic view illustrating a wheel of the vehicle and a positioning device corresponding to the wheel according to an embodiment of the present disclosure.

FIG. 4 is a schematic plan view illustrating the positioning devices 31, 32, 33, and 34 of the vehicle 1 according to an embodiment of the present disclosure. FIG. 5 is a schematic view illustrating one wheel 21, 22, 23, or 24 of the vehicle 1 and the positioning device 31, 32, 33, or 34 corresponding to the wheel 21, 22, 23, or 24 according to an embodiment of the present disclosure.

The positioning devices 31, 32, 33, and 34 rotate the wheels 21, 22, 23, and 24 to change the positions of the wheels 21, 22, 23, and 24 relative to the vehicle body 10. The positioning devices 31, 32, 33, and 34 are fixed to the vehicle body 10. Further, the wheels 21, 22, 23, and 24 are coupled to the positioning devices 31, 32, 33, and 34 so as to be rotatable. The positioning devices 31, 32, 33, and 34 may be disposed for the wheels 21, 22, 23, and 24, respectively. Accordingly, in the case where the four wheels 21, 22, 23, and 24 are disposed as in the embodiment of the present disclosure, a total of four positioning devices 31, 32, 33, and 34, that is, the first positioning device 31, the second positioning device 32, the third positioning device 33, and the fourth positioning device 34 may be disposed adjacent to the four wheels 21, 22, 23, and 24, respectively.

In describing components of the positioning devices 31, 32, 33, and 34, the first positioning device 31 will be described as representative of the positioning devices.

The positioning device 31, 32, 33, or 34 may be connected to the wheel frame 214 of the wheel 21, 22, 23, or 24. The area of the wheel frame 214 that is connected with the positioning device 31, 32, 33, or 34 may be the actuator area 2141. The point where the positioning device 31, 32, 33, or 34 and the wheel 21, 22, 23, or 24 are connected with each other may be located on the axis of rotation of the positioning device 31, 32, 33, or 34. The axis of rotation of the positioning device 31, 32, 33, or 34 may or may not be in agreement with (i.e., may or may not correspond to) the axis A2 of rotation of the in-wheel actuator 212.

The actuator area 2141 is formed to be offset from the center of the wheel frame 214 and to be biased to one side. Accordingly, as the positioning device 31, 32, 33, or 34 rotates the wheel frame 214 about the actuator area 2141, the axis A1 of rotation of the tire 211 may rotate about the axis of rotation of the positioning device 31, 32, 33, or 34, and the position of the wheel 21, 22, 23, or 24 relative to the vehicle body 10 may be changed. The axis A1 of rotation of the tire 211 may not correspond to the axis of rotation of the positioning device 31, 32, 33, or 34 or the axis A2 of rotation of the in-wheel actuator 212.

Because the position of the wheel 21, 22, 23, or 24 relative to the vehicle body 10 is changed through the above-described rotational operation, the range of the relative position of the wheel 21, 22, 23, or 24 may be formed like a circle having a predetermined radius with the positioning device 31, 32, 33, or 34 as the center.

The positioning device 31, 32, 33, or 34 may include a positioning drive member 311 that is implemented with a motor capable of generating a driving force and a shaft 312 of the positioning drive member 311 that is connected to the wheel frame 214 and that rotates to transmit the driving force of the positioning drive member 311 to the wheel frame 214. The shaft 312 of the positioning drive member 311 may protrude outward from the vehicle body 10 along the left/right direction D2. A positioning bearing 313 may be disposed between the shaft 312 of the positioning drive member 311 and the wheel 21, 22, 23, or 24 and may support a relative movement of the wheel 21, 22, 23, or 24 and the positioning device 31, 32, 33, or 34.

Figure 6:
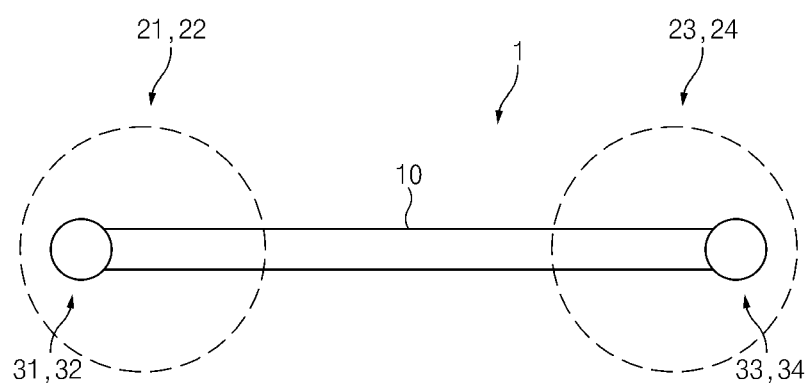
FIG. 6 is a schematic view illustrating a state in which wheels of the vehicle are disposed according to an embodiment of the present disclosure.

FIG. 6 is a schematic view illustrating a state in which the wheels 21, 22, 23, and 24 of the vehicle 1 are disposed according to an embodiment of the present disclosure.

The processor 40 may be electrically connected with the positioning devices 31, 32, 33, and 34 and may determine the positions of the wheels 21, 22, 23, and 24 relative to the vehicle body 10. The processor 40 is a component that includes an element capable of a logic operation of performing a control command. The processor 40 may include a central processing unit (CPU).

The processor 40 may be connected to components such as the positioning devices 31, 32, 33, and 34 and the wheels 21, 22, 23, and 24 to transfer signals according to control commands to the respective components and may be connected to various types of sensors or acquisition devices to receive obtained information in a signal form. The processor 40 may be electrically connected with the components. The processor 40 may form a wired connection with the components, or may further include a communication module capable of wireless communication to communicate with the components.

Control commands that the processor 40 performs may be stored and utilized on a storage medium, and the storage medium may be, but is not limited to, a device such as a hard disk drive (HDD), a solid state drive (SSD), a server, a volatile medium, a nonvolatile medium, or the like. In addition, data required for the processor 40 to perform tasks may be additionally stored in the storage medium.

The vehicle 1 may have to be driven in an environment such as a sidewalk that is complicated and has many obstacles. In this situation, according to a user operation, the processor 40, as illustrated in FIG. 6, may perform control according to a sidewalk movement mode such that the front wheels 21 and 22 and the rear wheels 23 and 24 are located closest to each other. According to this mode, the processor 40 may perform control such that the front wheels 21 and 22 and the rear wheels 23 and 24 move toward each other. After the control according to the sidewalk movement mode is performed, the separation distance between the front wheels 21 and 22 and the rear wheels 23 and 24 may be shorter than before.

According to the sidewalk movement mode, the processor 40 may send electrical signals to the respective positioning devices 31, 32, 33, and 34 to perform control such that the in-wheel actuators 212 of the front wheels 21 and 22 are located at front ends inside the front wheels 21 and 22 and the in-wheel actuators of the rear wheels 23 and 24 are located at rear ends inside the rear wheels 23 and 24.

By locating the wheels 21, 22, 23, and 24 as described above, the vehicle 1 may reduce the radius of rotation even in a complicated surrounding environment, thereby enabling the user to turn the direction promptly according to a driving situation and rapidly cope with the driving situation.

Figure 7:
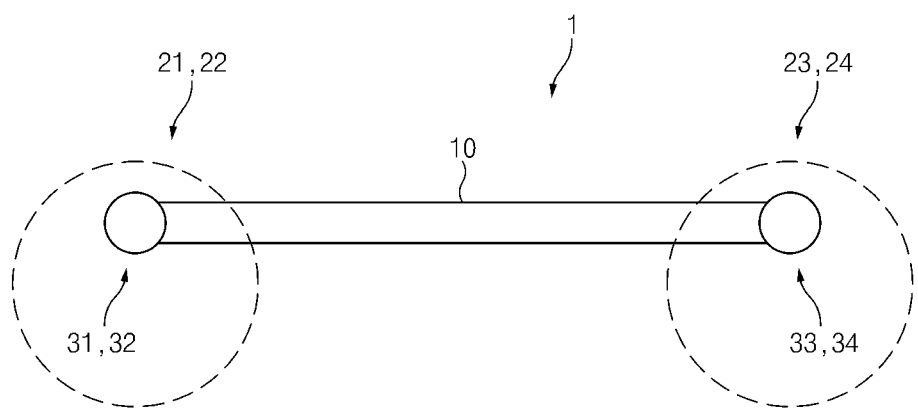
FIG. 7 is a schematic view illustrating a state in which the wheels of the vehicle are disposed in accordance with a medium-to-low speed mode according to an embodiment of the present disclosure.

FIG. 7 is a schematic view illustrating a state in which the wheels 21, 22, 23, and 24 of the vehicle 1 are disposed in accordance with a first medium-to-low speed mode according to an embodiment of the present disclosure.

The vehicle 1 according to the embodiment of the present disclosure may further include a speed sensor. The speed sensor may be disposed on the vehicle body 10. The speed sensor may sense the moving speed of the vehicle body 10 and may transmit the sensed information to the processor 40 electrically connected with the speed sensor.

When the speed of the vehicle body 10 sensed by the speed sensor is lower than a predetermined speed, the processor 40 may perform control according to the first medium-to-low speed mode as illustrated in FIG. 7.

According to the first medium-to-low speed mode, as illustrated in FIG. 7, the processor 40 may perform control such that the points where the wheels 21, 22, 23, and 24 are connected with the positioning devices 31, 32, 33, and 34 are located at upper ends inside the respective tires 211. According to the first medium-to-low speed mode, the processor 40 may perform control such that the points where the wheels 21, 22, 23, and 24 are connected with the positioning devices 31, 32, 33, and 34 are moved toward the upper ends inside the respective tires 211. That is, after the control according to the first medium-to-low speed mode is performed, the heights of the points, at which the wheels 21, 22, 23, and 24 are connected with the positioning devices 31, 32, 33, and 34, with respect to the ground may be higher than before.

Further, the vehicle 1 according to the embodiment of the present disclosure may further include a height detection sensor that senses the height of an obstacle located ahead of the vehicle body 10 and transmits the sensed height to the processor 40 electrically connected with the height detection sensor.

When the sensed height of the obstacle is less than or equal to a critical height that is a predetermined height, the processor 40, as illustrated in FIG. 7, may perform control according to an avoidance mode for avoiding the obstacle. The critical height may be less than or equal to the greatest height at which the vehicle body 10 is able to be located. When the aforementioned condition is satisfied, the processor 40 may perform control such that the points where the wheels 21, 22, 23, and 24 are connected with the corresponding positioning devices 31, 32, 33, and 34 are located in higher positions than the sensed height of the obstacle by a predetermined height. Accordingly, the vehicle body 10 may be in a higher position than the obstacle. In this state, the vehicle 1 may continue to travel, and the obstacle may pass beneath the vehicle body 10.

The state of FIG. 6 may be a result obtained by controlling the vehicle 1 according to a second medium-to-low speed mode. When the speed of the vehicle body 10 sensed by the speed sensor is lower than the predetermined speed, the processor 40, as illustrated in FIG. 6, may perform control according to the second medium-to-low speed mode such that the front wheels 21 and 22 and the rear wheels 23 and 24 move toward each other.

Figure 8:
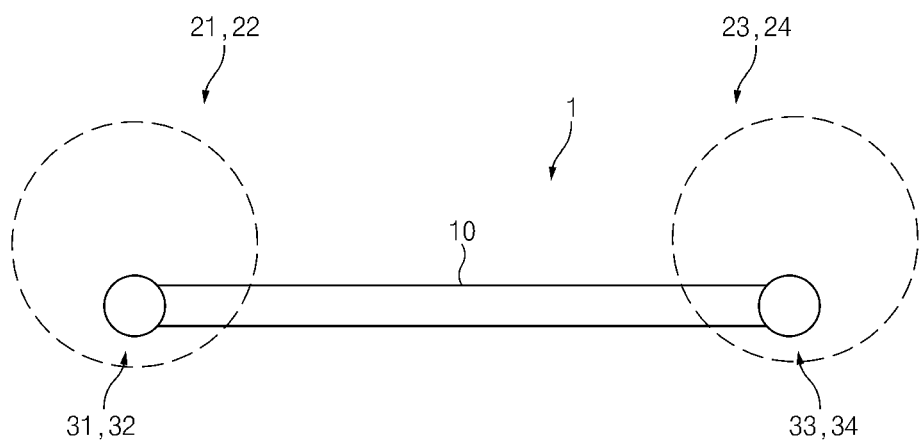
FIG. 8 is a schematic view illustrating a state in which the wheels of the vehicle are disposed in accordance with a first high speed mode according to an embodiment of the present disclosure.
Figure 9:
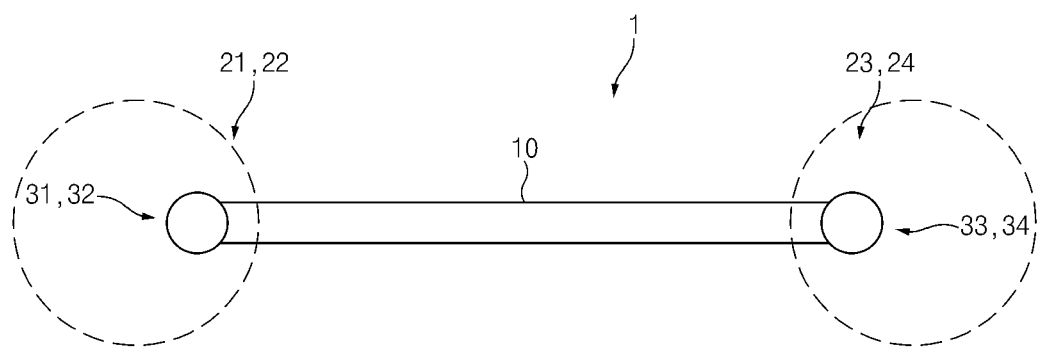
FIG. 9 is a schematic view illustrating a state in which the wheels of the vehicle are disposed in accordance with a second high speed mode according to an embodiment of the present disclosure.

FIG. 8 is a schematic view illustrating a state in which the wheels 21, 22, 23, and 24 of the vehicle 1 are disposed in accordance with a first high speed mode according to an embodiment of the present disclosure. FIG. 9 is a schematic view illustrating a state in which the wheels 21, 22, 23, and 24 of the vehicle 1 are disposed in accordance with a second high speed mode according to an embodiment of the present disclosure.

When the speed of the vehicle body 10 sensed by the speed sensor is greater than or equal to the predetermined speed, the processor 40 may perform control according to a high speed mode. The high speed mode may have the first high speed mode and the second high speed mode.

Referring to FIG. 8, the processor 40 may perform control according to the first high speed mode. When the sensed speed of the vehicle body 10 is greater than or equal to the predetermined speed, the processor 40 may perform control according to the first high speed mode such that the points where the wheels 21, 22, 23, and 24 are connected with the positioning devices 31, 32, 33, and 34 are located at lower ends inside the tires 211. This is because it is preferable that the center of gravity of the vehicle 1 be located in a low position when the vehicle 1 travels at high speed.

According to the first high speed mode, the processor 40 may perform control such that the points where the wheels 21, 22, 23, and 24 are connected with the positioning devices 31, 32, 33, and 34 are moved toward the lower ends inside the respective tires 211. That is, after the control according to the first high speed mode is performed, the heights of the points, at which the wheels 21, 22, 23, and 24 are connected with the positioning devices 31, 32, 33, and 34, with respect to the ground may be lower than before.

Referring to FIG. 9, the processor 40 may perform control according to the second high speed mode. According to the second high speed mode, the processor 40 may perform control such that the front wheels 21 and 22 and the rear wheels 23 and 24 are maximally spaced apart from each other. The stability of the vehicle 1 may be ensured even during high-speed driving because the front wheels 21 and 22 and the rear wheels 23 and 24 are spaced farthest away from each other. According to this mode, the processor 40 may perform control such that the front wheels 21 and 22 and the rear wheels 23 and 24 move away from each other. After the control according to the second high speed mode is performed, the separation distance between the front wheels 21 and 22 and the rear wheels 23 and 24 may be longer than before.

Figure 10:
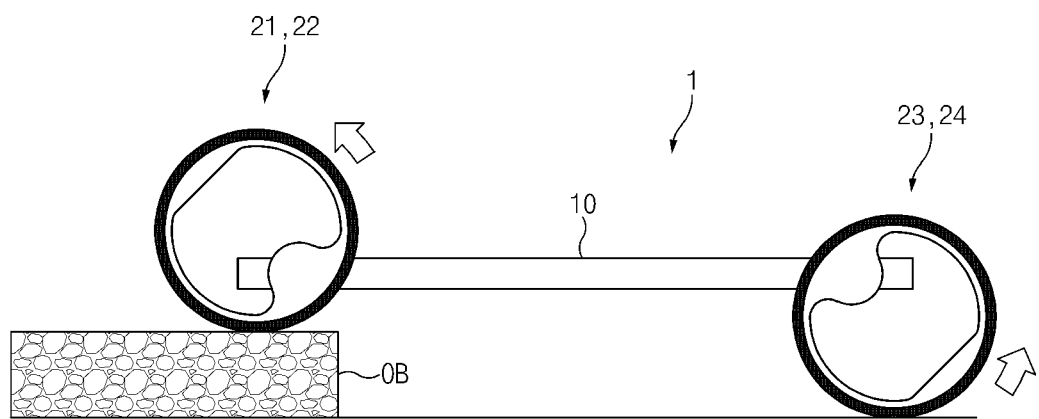
FIG. 10 is a schematic side view illustrating a state in which the wheels of the vehicle are disposed in accordance with an obstacle-overcoming mode according to an embodiment of the present disclosure.
Figure 11:
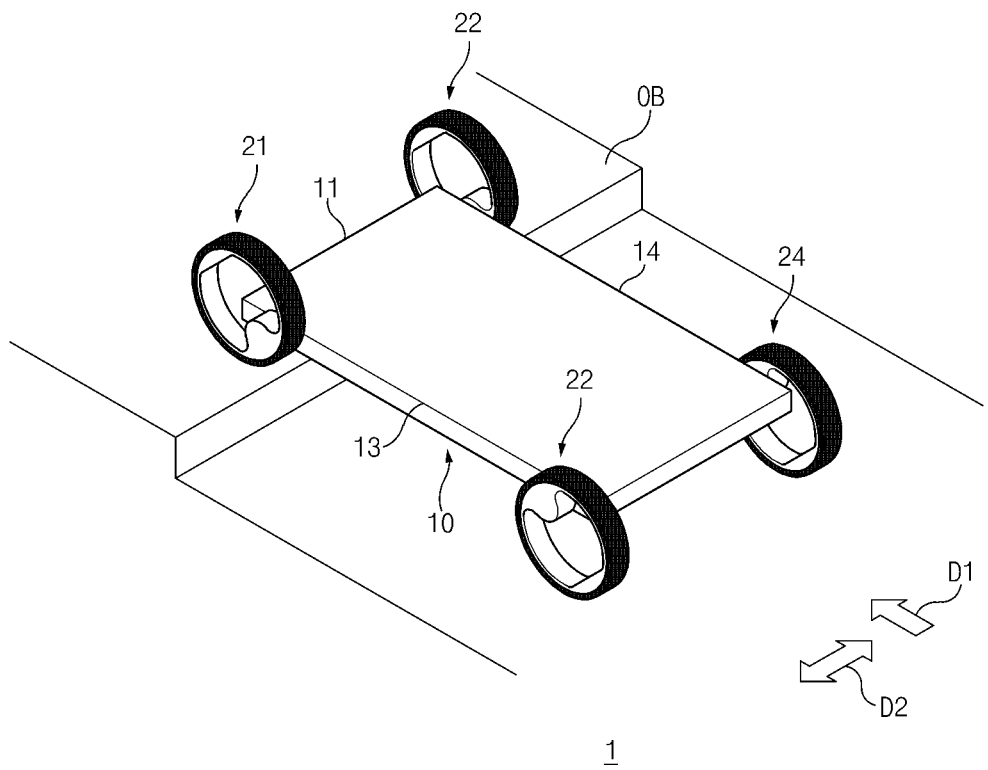
FIG. 11 is a schematic perspective view illustrating the state in which the wheels of the vehicle are disposed in accordance with the obstacle-overcoming mode according to the embodiment of the present disclosure.

FIG. 10 is a schematic side view illustrating a state in which the wheels 21, 22, 23, and 24 of the vehicle 1 are disposed in accordance with an obstacle-overcoming mode according to an embodiment of the present disclosure. FIG. 11 is a schematic perspective view illustrating the state in which the wheels 21, 22, 23, and 24 of the vehicle 1 are disposed in accordance with the obstacle-overcoming mode according to the embodiment of the present disclosure.

The vehicle 1 according to the embodiment of the present disclosure may further include an obstacle detection sensor. The obstacle detection sensor may be disposed at a front end of the vehicle body 10. The obstacle detection sensor may sense the distance between the vehicle body 10 and an obstacle OB located ahead of the vehicle body 10 and may transmit the sensed distance to the processor 40 electrically connected with the obstacle detection sensor.

When the sensed distance is less than or equal to a predetermined distance, the processor 40 may perform control according to the obstacle-overcoming mode. So as to allow the front wheels 21 and 22 to climb up the obstacle OB while rotating in the counterclockwise direction when viewed from the left of the vehicle body 10, the processor 140 may perform control according to the obstacle-overcoming mode such that the points where the front wheels 21 and 22 are connected with the corresponding positioning devices 31 and 32 are located at the upper ends inside the tires 211. The front wheels 21 and 22 may easily climb up the obstacle OB through the control.

So as to minimize the slope of the vehicle body 10 with respect to the horizontal direction, the processor 40 may perform control such that the points where the positioning devices 33 and 34 corresponding to the rear wheels 23 and 24 are connected with the rear wheels 23 and 24 are located at the upper ends inside the tires, at the same time that the front wheels 21 and 22 are controlled as described above according to the obstacle-overcoming mode.

Meanwhile, when the front wheels 21 and 22 are controlled as described above according to the obstacle-overcoming mode, the processor 40 may perform control such that the points where the positioning devices 33 and 34 corresponding to the rear wheels 23 and 24 are connected with the rear wheels 23 and 24 are located at the lower ends inside the tires of the rear wheels 23 and 24.

After the front wheels 21 and 22 climb up the obstacle OB, so as to allow the rear wheels 23 and 24 to rotate in the counterclockwise direction when viewed from the left of the vehicle body 10, the processor 40 may perform control such that the points where the positioning devices 33 and 34 corresponding to the rear wheels 23 and 24 are connected with the rear wheels 23 and 24 are located at the upper ends inside the tires of the rear wheels 23 and 24. Further, so as to minimize the slope of the vehicle body 10 with respect to the horizontal direction, the processor 40 may perform control such that the points where the positioning devices 31 and 32 corresponding to the front wheels 21 and 22 are connected with the front wheels 21 and 22 are located at the lower ends inside the tires 211 of the front wheels 21 and 22. Accordingly, the rear wheels 23 and 24 may also easily climb up the obstacle OB.

After the rear wheels 23 and 24 climb up the obstacle OB, the processor 40 may perform control such that the points where the positioning devices 33 and 34 corresponding to the rear wheels 23 and 24 are connected with the rear wheels 23 and 24 are located at the lower ends inside the tires of the rear wheels 23 and 24. Accordingly, the vehicle body 10 may return to the state parallel to the horizontal direction.

Figure 12:
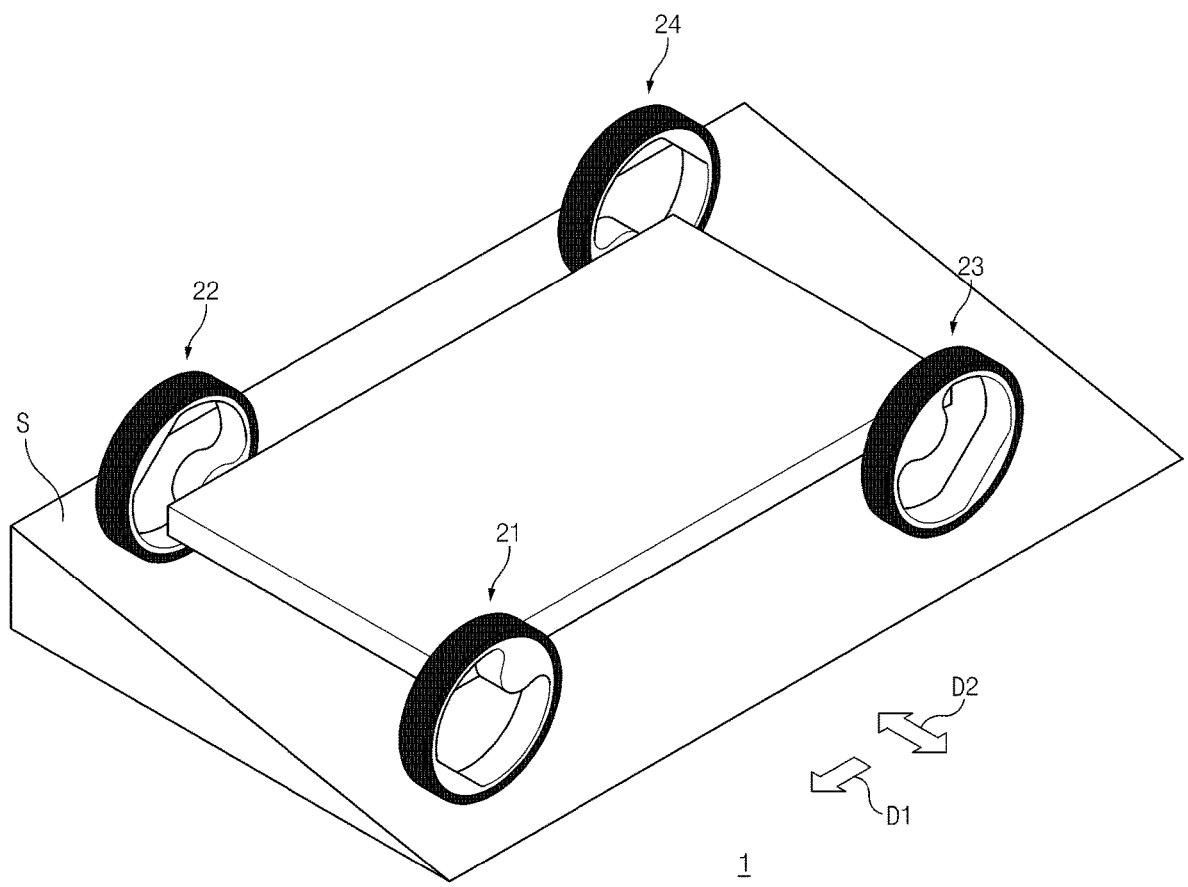
FIG. 12 is a schematic perspective view illustrating a state in which the wheels of the vehicle are disposed in accordance with a tilt mode or an active tilting mode according to an embodiment of the present disclosure.

FIG. 12 is a schematic perspective view illustrating a state in which the wheels 21, 22, 23, and 24 of the vehicle 1 are disposed in accordance with a tilt mode or an active tilting mode according to an embodiment of the present disclosure.

The vehicle 1 according to the embodiment of the present disclosure may further include a tilt sensor. The tilt sensor may be disposed on the vehicle body 10. When the vehicle 10, as illustrated in FIG. 12, is located on an inclined surface S and therefore has a slope, the tilt sensor may sense the slope of the vehicle body 10 and may transmit the sensed slope to the processor 40 electrically connected with the tilt sensor.

When the sensed slope is greater than or equal to a predetermined slope, the processor 40 may perform control according to the tilt mode. When the processor 40 makes a determination based on the sensed slope, one of the left and right sides 13 and 14 of the vehicle body 10 may be higher than the other. FIG. 12 illustrates an example that the right side 14 of the vehicle body 10 is higher than the left side 13 of the vehicle body 10. The processor 40 may perform control such that the points where the two wheels 21 and 23 or 22 and 24 located on the left or right side 13 or 14 that is in a relatively high position are connected with the corresponding two positioning devices 31 and 33 or 32 and 34 are located at the lower ends inside the tires 211. The processor 40 may perform control such that the points where the two wheels 21 and 23 or 22 and 24 located on the left or right side 13 or 14 that is in a relatively low position are connected with the corresponding two positioning devices 31 and 33 or 32 and 34 are located at the upper ends inside the tires 211. In the situation illustrated in FIG. 12, the processor 40 performs control such that the points where the positioning devices 32 and 34 corresponding to the second and fourth wheels 22 and 24 on the right side 14 are connected with the wheels 22 and 24 are located at the lower ends inside the tires, and the processor 40 performs control such that the points where the positioning devices 31 and 33 corresponding to the first and third wheels 21 and 22 on the left side 13 are connected with the wheels 21 and 23 are located at the upper ends inside the tires 211.

According to the sensed slope, the processor 40 may perform control such that the points where the two positioning devices 31 and 33 or 32 and 34 corresponding to the two wheels 21 and 23 or 22 and 24 located on the left or right side 13 or 14 that is in a relatively high position are connected with the corresponding two wheels 21 and 23 or 22 and 24 are higher than the points where the two positioning devices 31 and 33 or 32 and 34 corresponding to the two wheels 21 and 23 or 22 and 24 located on the left or right side 13 or 14 that is in a relatively low position are connected with the corresponding two wheels 21 and 23 or 22 and 24, and the height difference between the points is proportional to the sensed slope.

Further, the processor 40 may perform control according to the active tilting mode such that the vehicle body 10 has a posture illustrated in FIG. 12. Based on the degree to which the steering apparatus steers the vehicle body 10 and the sensed speed, the processor 40 may perform control according to the active tilting mode such that the points where the two positioning devices 31 and 33 or 32 and 34 corresponding to the two wheels 21 and 23 or 22 and 24 located on one of the left and right sides 13 and 14 of the vehicle body 10 are connected with the corresponding two wheels 21 and 23 or 22 and 24 are lower than the points where the two positioning devices 31 and 33 or 32 and 34 corresponding to the two wheels 21 and 23 or 22 and 24 located on the other side are connected with the corresponding two wheels 21 and 23 or 22 and 24. Specifically, the processor 40 may control such that the points where the two positioning devices 31 and 33 or 32 and 34 corresponding to the two wheels 21 and 23 or 22 and 24 located on one side to which the vehicle body 10 is determined to be steered by the steering apparatus are connected with the corresponding two wheels 21 and 23 or 22 and 24 are located at the lower ends inside the tires 211 and the points where the two positioning devices 31 and 33 or 32 and 34 corresponding to the two wheels 21 and 23 or 22 and 24 located on the opposite side are connected with the corresponding two wheels 21 and 23 or 22 and 24 are located at the upper ends inside the tires 211.

The vehicle 1 according to the embodiment of the present disclosure changes the positions of the wheels 21, 22, 23, and 24 relative to the vehicle body 10 by the above-described structure and controls, thereby actively responding to various environmental changes and ensuring the stability of driving.

According to the embodiments of the present disclosure, the vehicle changes the positions of the wheels relative to the vehicle body, thereby actively responding to various environmental changes and ensuring the stability of driving.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle comprising:
   a vehicle body; and
   at least one wheel including:
      an annular tire configured to rotate to drive the vehicle body along a main driving direction,
      a wheel gear disposed on an inner surface of the tire, and an in-wheel actuator connected to the wheel gear and configured to rotate so as to rotate the tire; and
      at least one positioning device fixed to the vehicle body and configured to rotate the at least one wheel relative to the vehicle body to change positions of the at least one wheel relative to the vehicle body,
      wherein the at least one wheel is coupled to the at least one positioning device so as to be rotatable,
   wherein an axis of rotation of the tire is different than an axis of rotation of the in-wheel actuator;
   wherein an axis of rotation of the tire is parallel with an axis of rotation of the in-wheel actuator; and
   wherein when the at least one wheel rotates relative to the vehicle body to change positions of the at least one wheel relative to the vehicle body, positions of axis of rotation of the tire relative to the axis of rotation of the in-wheel actuator are changed.

2. The vehicle of claim 1, wherein each of the at least one wheel further includes a wheel frame configured to cover the inner surface of the tire to form a space in which the wheel gear is embedded, and
   wherein the wheel frames are coupled to the at least one positioning device so as to be rotatable.

3. The vehicle of claim 2, wherein the wheel frames are formed in an annular shape that is open in a center.

4. The vehicle of claim 1, wherein axes of rotation of the at least one positioning device correspond to axes of rotation of the in-wheel actuators.

5. The vehicle of claim 1, wherein axes of rotation of the positioning devices, axes of rotation of the in-wheel actuators, and axes of rotation of the tires do not correspond with one another.

6. The vehicle of claim 1, wherein gear teeth engaged with the in-wheel actuator are formed on an inner surface of the wheel gear such that the wheel gear is rotated by rotation of the in-wheel actuator.

7. The vehicle of claim 1, further comprising:
a processor electrically connected with the at least one positioning device and configured to determine positions of the at least one wheel relative to the vehicle body,
wherein the at least one wheel comprises four wheels, two of the wheels being disposed on front left and right sides of the vehicle body with respect to the main driving direction, respectively, the remaining two wheels being disposed on rear left and right sides of the vehicle body, respectively, and
wherein the at least one positioning device comprises four positioning devices connected to the four wheels respectively.

8. The vehicle of claim 7, further comprising:
a speed sensor configured to sense a moving speed of the vehicle body and transmit sensed information to the processor electrically connected with the speed sensor,
wherein when the sensed speed of the vehicle is greater than or equal to a predetermined speed, the processor performs control such that the two wheels disposed at the front of the vehicle body move away from the two wheels disposed at the back of the vehicle body.

9. The vehicle of claim 7, further comprising:
a speed sensor configured to sense a moving speed of the vehicle body and transmit the sensed speed to the processor electrically connected with the speed sensor,
wherein when the sensed speed of the vehicle body is greater than or equal to a predetermined speed, the processor performs control such that points where the wheels are connected with the positioning devices are moved toward lower ends inside the tires.

10. The vehicle of claim 7, further comprising:
a speed sensor configured to sense a moving speed of the vehicle body and transmit the sensed speed to the processor electrically connected with the speed sensor,
wherein when the sensed speed of the vehicle body is lower than a predetermined speed, the processor performs control such that points where the wheels are connected with the positioning devices are moved toward upper ends inside the tires.

11. The vehicle of claim 7, further comprising:
a speed sensor configured to sense a moving speed of the vehicle body and transmit the sensed speed to the processor electrically connected with the speed sensor,
wherein when the sensed speed of the vehicle is lower than a predetermined speed, the processor performs control such that the two wheels disposed at the front of the vehicle body move toward the two wheels disposed at the back of the vehicle body.

12. The vehicle of claim 7, wherein the wheels disposed on the front left and right sides of the vehicle body, respectively, are referred to as front wheels, and the wheels disposed on the rear left and right sides of the vehicle body, respectively, are referred to as rear wheels,
wherein the vehicle further comprises an obstacle detection sensor configured to sense a distance between the vehicle body and an obstacle located ahead of the vehicle body and transmit the sensed distance to the processor electrically connected with the obstacle detection sensor, and
wherein when the sensed distance is less than or equal to a predetermined distance, so as to allow the front wheels to climb up the obstacle, the processor performs control such that points where the front wheels are connected with the corresponding positioning devices are located at upper ends inside the tires of the front wheels.

13. The vehicle of claim 12, wherein after the front wheels climb up the obstacle, the processor performs control such that points where the rear wheels are connected with the corresponding positioning devices are located at upper ends inside the tires of the rear wheels.

14. The vehicle of claim 13, wherein the processor performs control such that the points where the front wheels are connected with the corresponding positioning devices are located at lower ends inside the tires of the front wheels.

15. The vehicle of claim 12, wherein the processor performs control such that points where the rear wheels are connected with the corresponding positioning devices are located at lower ends inside the tires of the rear wheels.

16. The vehicle of claim 7, further comprising:
a tilt sensor configured to sense a slope of the vehicle body and transmit the sensed slope to the processor electrically connected with the tilt sensor,
wherein when the sensed slope is greater than or equal to a predetermined slope, the processor performs control such that points where the two wheels located on the left or right side of the vehicle body that is determined to be in a higher position based on the sensed slope are connected with the corresponding positioning devices are located at lower ends inside the tires, and the processor performs control such that points where the two wheels located on the left or right side of the vehicle body that is in a lower position are connected with the corresponding positioning devices are located at upper ends inside the tires.

17. The vehicle of claim 7, further comprising:
a speed sensor configured to sense a moving speed of the vehicle body and transmit the sensed speed to the processor electrically connected with the speed sensor; and
a steering apparatus configured to steer the vehicle body during travel of the vehicle and transmit a degree to which the vehicle body is steered to the processor electrically connected with the steering apparatus,
wherein based on the degree to which the steering apparatus steers the vehicle body and the sensed speed, the processor performs control such that points where the two wheels located on one of the left and right sides of the vehicle body are connected with the corresponding positioning devices are located to be lower than points where the two wheels located on the other side are connected with the corresponding positioning devices.

18. The vehicle of claim 7, further comprising:
a height detection sensor configured to sense a height of an obstacle located ahead of the vehicle body and transmit the sensed height to the processor electrically connected with the height detection sensor, wherein when the sensed height is less than or equal to a critical height, the processor performs control such that points where the wheels are connected with the corresponding positioning devices are located to be greater than the sensed height by a predetermined height.

* * * * *